United States Patent
Hirata et al.

(10) Patent No.: US 12,270,993 B2
(45) Date of Patent: Apr. 8, 2025

(54) VEHICLE INFORMATION DISPLAY APPARATUS AND INFORMATION DISPLAY SYSTEM FOR VEHICLE

(71) Applicant: Maxell, Ltd., Kyoto (JP)

(72) Inventors: Koji Hirata, Kyoto (JP); Koji Fujita, Kyoto (JP)

(73) Assignee: MAXELL, LTD., Kyoto (JP)

( * ) Notice: Subject to any disclaimer, the term of this patent is extended or adjusted under 35 U.S.C. 154(b) by 711 days.

(21) Appl. No.: 17/429,688

(22) PCT Filed: Jan. 22, 2020

(86) PCT No.: PCT/JP2020/002081
§ 371 (c)(1),
(2) Date: Aug. 10, 2021

(87) PCT Pub. No.: WO2020/166286
PCT Pub. Date: Aug. 20, 2020

(65) Prior Publication Data
US 2022/0155589 A1   May 19, 2022

(30) Foreign Application Priority Data
Feb. 15, 2019   (JP) .................... 2019-025783

(51) Int. Cl.
*G02B 27/01* (2006.01)
*B60K 35/23* (2024.01)

(52) U.S. Cl.
CPC .......... *G02B 27/0101* (2013.01); *B60K 35/23* (2024.01); *G02B 2027/0118* (2013.01)

(58) Field of Classification Search
CPC .......... G02B 27/0101; G02B 2027/011; B60K 35/23; B60K 35/00; B60K 35/231;
(Continued)

(56) References Cited

U.S. PATENT DOCUMENTS

| 5,552,935 A | 9/1996 | Knoll et al. |
| 8,350,686 B2 | 1/2013 | Inoue |

(Continued)

FOREIGN PATENT DOCUMENTS

| DE | 202015003050 U1 | 8/2016 |
| DE | 102016124987 A1 | 6/2018 |

(Continued)

OTHER PUBLICATIONS

Office Action issued on May 9, 2023, in corresponding Japanese patent Application No. 2022-121845, 12 pages.

(Continued)

*Primary Examiner* — George G. King
(74) *Attorney, Agent, or Firm* — XSENSUS LLP

(57) ABSTRACT

A vehicle information display apparatus using a part of a shield glass of a vehicle to display information on an inside of the vehicle includes: a video display apparatus provided inside the vehicle to project video light of the information; a transparent sheet provided on an inner surface of the display region set to the part of the shield glass; and a light direction converting panel to convert a direction of the video light from the video display apparatus toward the transparent sheet. The transparent sheet includes a phase difference plate, an absorption type polarizing plate to absorb a specific polarized wave, and a transparent sheet member having a light diffusion effect in order from the shield glass side toward the video display apparatus. The information by the video light whose direction is converted by the light direction converting panel is displayed to the inside of the vehicle.

12 Claims, 14 Drawing Sheets

(58) Field of Classification Search
CPC .. B60K 35/232; B60K 35/233; B60K 35/234; B60K 35/235
See application file for complete search history.

(56) References Cited

U.S. PATENT DOCUMENTS

| | | | |
|---|---|---|---|
| 10,036,890 | B2 | 7/2018 | Yamaoka |
| 10,310,257 | B2 | 6/2019 | Hirata et al. |
| 2006/0023315 | A1 | 2/2006 | Robinson |
| 2011/0093190 | A1 | 4/2011 | Yoon |
| 2014/0268358 | A1 | 9/2014 | Kusaka et al. |
| 2015/0362728 | A1 | 12/2015 | Tei |
| 2016/0195719 | A1 | 7/2016 | Yonetani |
| 2018/0052321 | A1 | 2/2018 | Kong |
| 2018/0180878 | A1 | 6/2018 | Yokoe et al. |
| 2018/0180982 | A1 | 6/2018 | Yamaki et al. |
| 2018/0348411 | A1 | 12/2018 | Yamaki et al. |
| 2022/0219538 | A1* | 7/2022 | Hirata .................... B60K 35/00 |

FOREIGN PATENT DOCUMENTS

| | | | |
|---|---|---|---|
| DE | 102017202566 A1 | 8/2018 | |
| DE | 102017206365 A1 | 10/2018 | |
| JP | 3-505489 A | 11/1991 | |
| JP | 2000-289488 A | 10/2000 | |
| JP | 2010-79197 A | 4/2010 | |
| JP | 2012-192791 A | 10/2012 | |
| JP | 2014-043205 A | 3/2014 | |
| JP | 2014-174494 A | 9/2014 | |
| JP | 2014-197163 A | 10/2014 | |
| JP | 2015-194707 A | 11/2015 | |
| JP | 2015-225118 A | 12/2015 | |
| JP | 2017-015778 A | 1/2017 | |
| JP | 6133522 B1 | 5/2017 | |
| JP | 2017151918 A | 8/2017 | |
| JP | 6199530 B1 | 9/2017 | |
| JP | 2018-072488 A | 5/2018 | |
| JP | 2018-518404 A | 7/2018 | |
| JP | 2019-003081 A | 1/2019 | |
| WO | 2009/072366 A1 | 6/2009 | |
| WO | 2015/170406 A1 | 11/2015 | |
| WO | WO-2020203767 A1 * | 10/2020 | |

OTHER PUBLICATIONS

Japanese Office Action issued Sep. 5, 2023, in corresponding Japanese Application No. 2022-121845, 14pp.
International Search Report and Written Opinion mailed on Apr. 7, 2020, received for PCT Application PCT/JP2020/002081, Filed on Jan. 22, 2020, 9 pages including English Translation.
Office Action issued on Jun. 25, 2024, in corresponding Japanese patent Application No. 2023-204079, 14 pages.
Notification of Reasons for Refusal issued from Japanese Patent Office Patent Office on Nov. 5, 2024 in Japanese Patent Application 2023-204079, 12pp.

* cited by examiner

FIG. 1
(a)
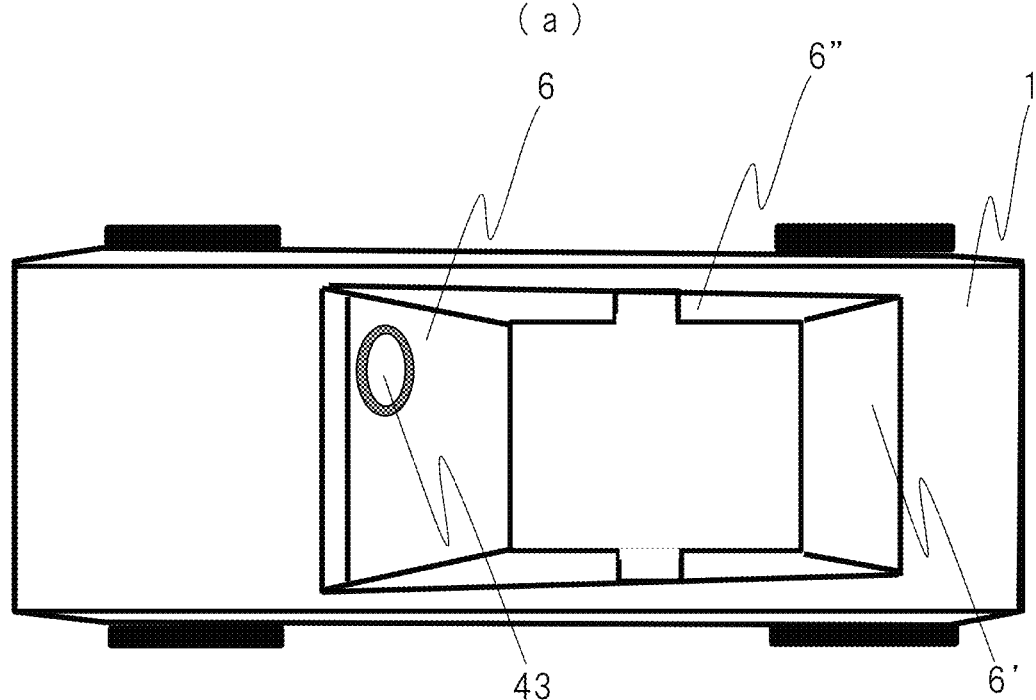
(b)
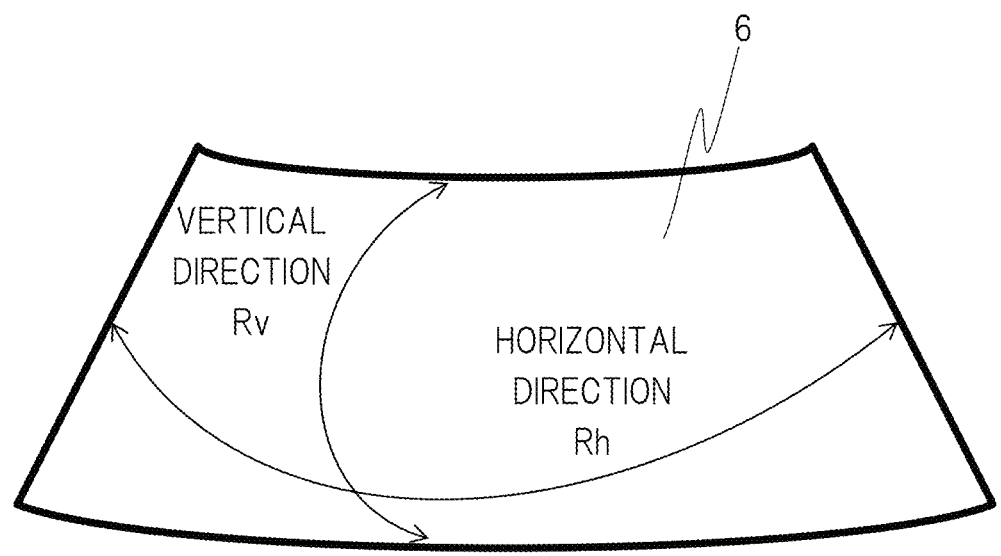

FIG. 5
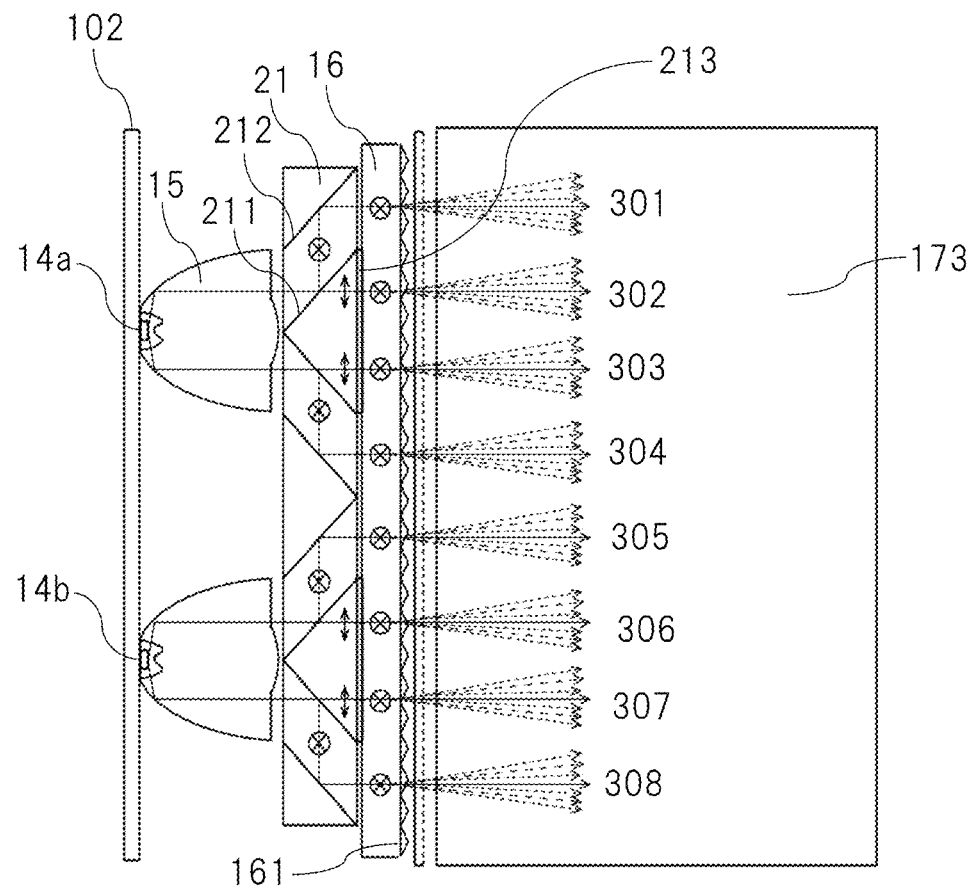
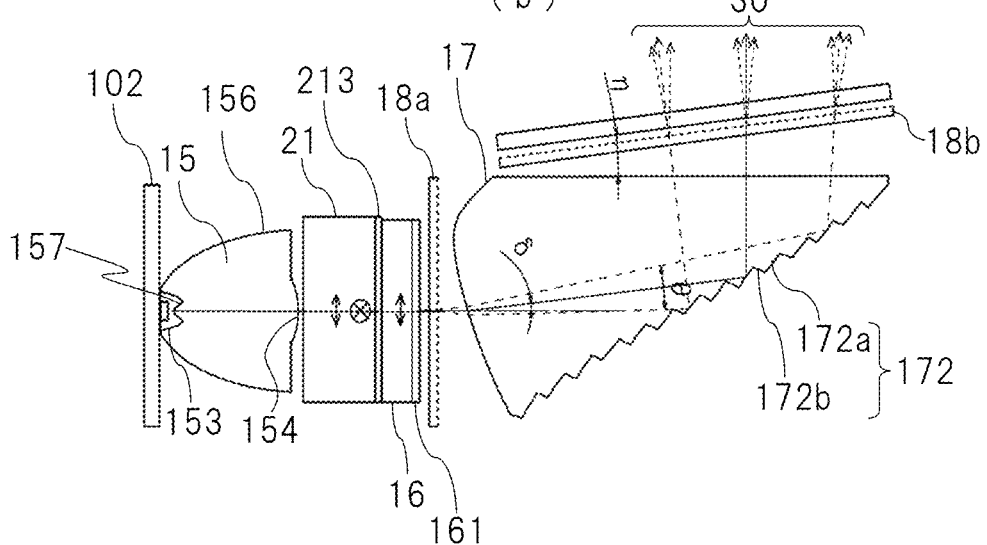

FIG. 9
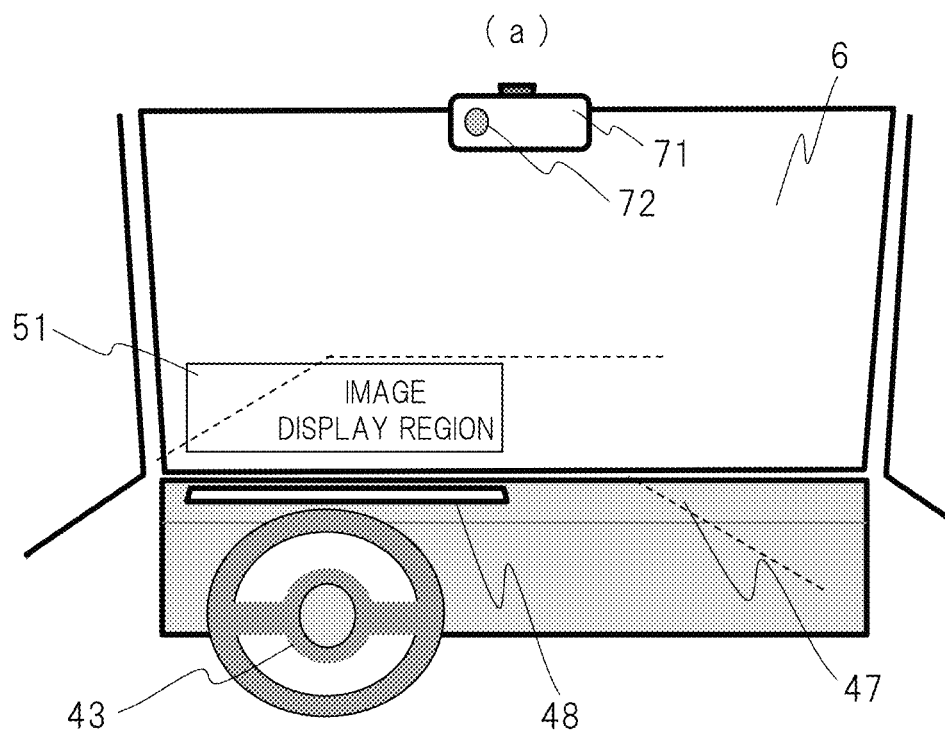
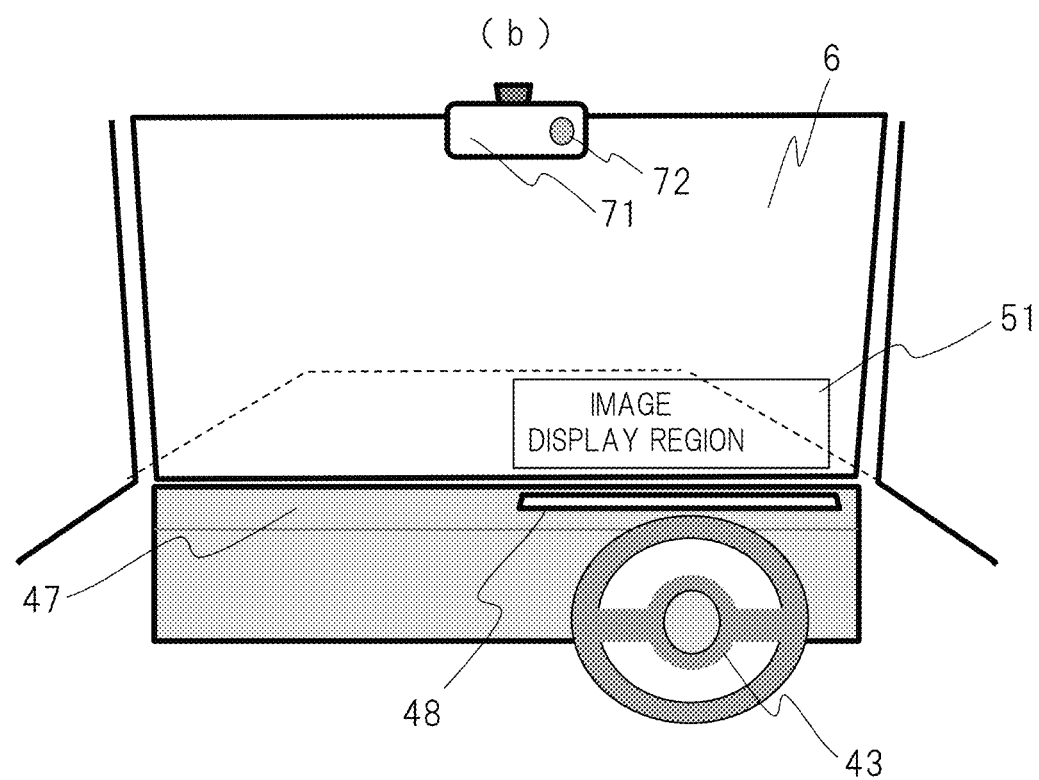

Reflection factor of glass with respect to p-polarized light and s-polarized light

VEHICLE INFORMATION DISPLAY APPARATUS AND INFORMATION DISPLAY SYSTEM FOR VEHICLE

CROSS-REFERENCE TO RELATED APPLICATIONS

The present application is based on PCT filing PCT/JP2020/002081, filed Jan. 22, 2020, which claims priority to JP 2019-025783, filed Feb. 15, 2019, the entire contents of each are incorporated herein by reference.

TECHNICAL FIELD

The present invention relates to a vehicle information display apparatus, which projects and display video light on a windshield (a front window glass), a rear window glass, side window glasses and the like, or a combiner of an automobile, an electric train, an airplane, or the like (hereinafter, generally referred to as a "conveyance" or a "vehicle"). In particular, the present invention relates to a vehicle information display apparatus and an information display system for vehicle capable of reflecting or transmitting video information through a windshield, a rear window glass, or the like to display it in one direction toward the inside or the outside of the vehicle.

BACKGROUND ART

A so-called head up display (HUD: Head-Up-Display) apparatus has already been known by Patent Document 1 and the like, for example. The head up display apparatus projects video light onto a windshield or a combiner of a vehicle to form a virtual image, thereby displaying traffic information such as route information or traffic jam information and vehicle information such as a remaining amount of fuel or cooling water temperature thereon.

In order to reduce movement of a point of view of a driver, this type of information display apparatus can generally monitor video information as a virtual image. Thus, many of ones each of which projects video displayed on a video display apparatus to the point of view of the driver by using an optical system including a concave mirror (an action of a convex lens) are adopted.

Further, although it is different from this type of information display apparatus, a transparent screen or a reflective screen that is provided with a light diffusing layer containing a binder and fine particles as a screen generally used in a video display apparatus provided with the screen has already been known from Patent documents 2 and 3 below.

RELATED ART DOCUMENTS

Patent Documents

Patent document 1: Japanese Patent Application Publication No. 2015-194707
Patent document 2: Japanese Patent No. 6133522
Patent document 3: Japanese Patent No. 6199530

SUMMARY OF THE INVENTION

Problems to be Solved by the Invention

In the head up display type vehicle information display apparatus described above, which is a conventional technique, AR (Augmented-Reality=augmented reality) information that is a virtual image is displayed so as not to obstruct a field of view from a driver to the outside of a vehicle. However, for example, in a case where information such as a map is to be displayed, displayed map information may obstruct the field of view to the outside. Further, in such a vehicle information display apparatus, it is desired to expand a displayable area, and a virtual image is required to have high resolution and high visibility. For that reason, a liquid crystal display element (or a liquid crystal display panel) is often used because images with high quality can be obtained easily and the liquid crystal display element is inexpensive. On the other hand, a new problem, which since a small liquid crystal display element is used in order to reduce a size of a set, resolution of an obtained projection image is insufficient, for example, it is not suitable to display video with high resolution to be displayed on a smartphone, has become clear.

Further, such a head up display type vehicle information display apparatus is not intended to display video information to the outside of the vehicle. For that reason, in a case where video information is to be displayed to the outside of the vehicle, a video display apparatus such as a display is mounted inside the vehicle and the video information is displayed through the glass of the vehicle. However, in that case, this video display apparatus obstructs the field of view of the driver, and this is not preferable for safe driving.

Note that Patent documents 2 and 3, which are conventional techniques, disclose a reflective screen or a transparent screen provided with a light diffusing layer containing a binder and fine particles used in an information display apparatus, but do not teach application in the vehicle to which the present invention is related, and a specific method, a specific form, or a specific configuration for that purpose.

It is an object of the present invention to provide a vehicle information display apparatus capable of so-called unidirectional display in place of a conventional head up display type vehicle information display apparatus. The vehicle information display apparatus is allowed to display video information with high resolution via a windshield (furthermore, a rear window glass or a side window glass), which is a shield glass of a vehicle. In that case, a passenger (or passengers) including a driver inside the vehicle can view the displayed video information, but it is impossible to view it from the outside of the vehicle. Alternatively, it is possible to view the displayed video information from the outside of the vehicle, but the passenger (or the passengers) inside the vehicle cannot view it. Moreover, it is also an object of the present invention to provide an information display system for vehicle, which uses such a vehicle information display apparatus.

Means for Solving the Problem

In order to achieve the objects described above, in the present invention, there is provided a vehicle information display apparatus for using a part of a shield glass of a vehicle as a display region to display information on an inside of the vehicle. The vehicle information display apparatus includes: a video display apparatus provided inside the vehicle, the video display apparatus being configured to project video light of the information; a transparent sheet provided on an inner surface of the display region set to the part of the shield glass; and a light direction converting panel configured to convert a direction of the video light from the video display apparatus toward the transparent sheet. In this case, the transparent sheet includes a phase difference plate, an absorption type polarizing plate configured to absorb a specific polarized wave, and a transparent sheet member having a light diffusion effect in order from a side of the shield glass toward the video display apparatus. Further, the information by the video light whose direction is converted by the light direction converting panel is displayed to the inside of the vehicle.

Further, in order to achieve the objects described above, in the present invention, there is provided an information display system for vehicle for using a part of a shield glass of a vehicle to display information. At least one of the vehicle information display apparatuses respectively described in claims 1 to 12 is provided in the vehicle. In this case, the part of the shield glass of the vehicle is used as a display region, and video light from the vehicle information display apparatus is projected toward the transparent sheet provided on the inner surface of the display region that is provided at the part of the shield glass of the vehicle.

Effects of the Invention

According to the present invention, effects that a vehicle information display apparatus capable of displaying video information with high resolution in one direction is provided and a new information display system for vehicle with excellent usability using such a vehicle information display apparatus is further provided can be exerted.

BRIEF DESCRIPTIONS OF THE DRAWINGS

FIG. 1 is a top view of an automobile on which an information display system for vehicle according one embodiment of the present invention is mounted and a view for explaining a difference of radii of curvature of a windshield;

FIG. 5 is a view illustrating one example of an optical system of the light source apparatus constituting the video projecting apparatus;

FIG. 9 is a view illustrating one example of arrangement in a cockpit of the automobile in which the vehicle information display apparatus is arranged;

DETAILED DESCRIPTION OF EMBODIMENTS

Figure 2:
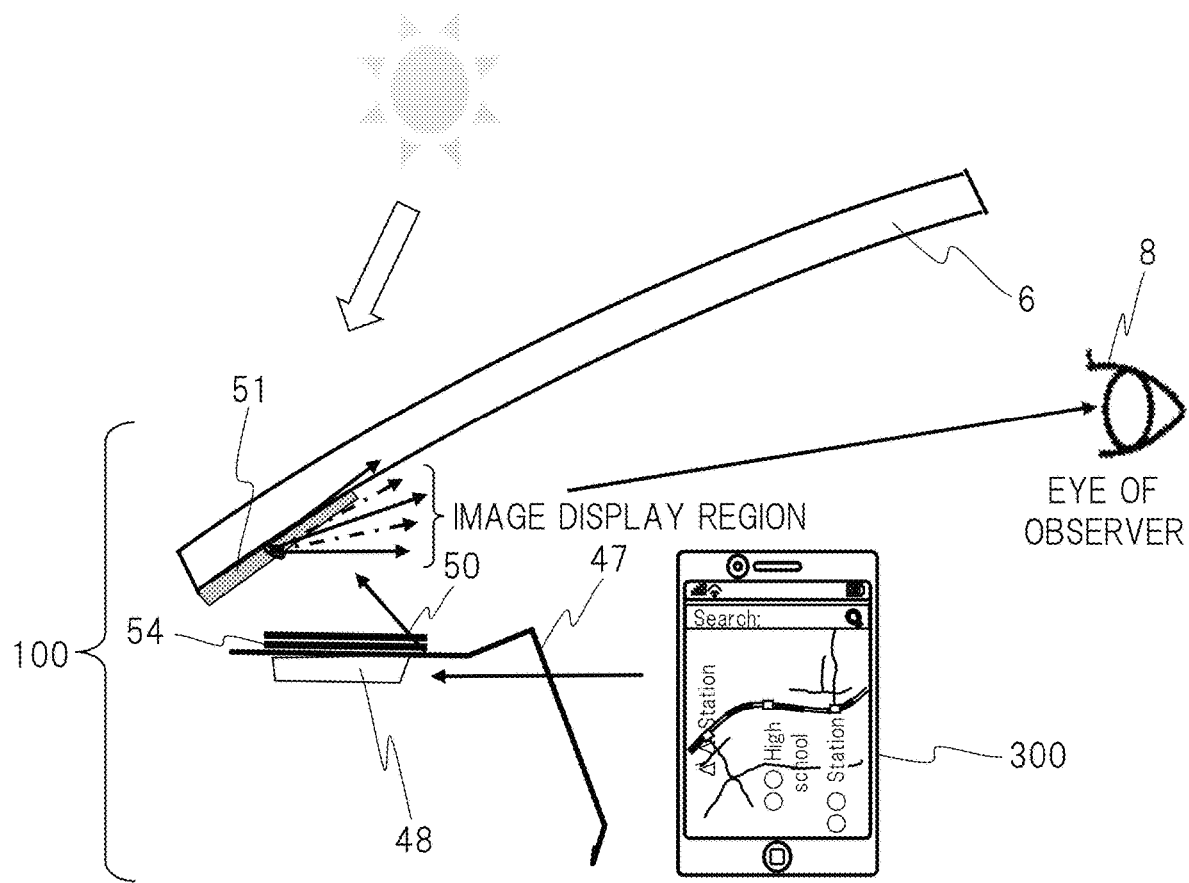
FIG. 2 is a view illustrating a schematic configuration of a vehicle information display apparatus constituting the information display system for vehicle according to one embodiment of the present invention.

Hereinafter, embodiments of the present invention will be described in detail with reference to the drawings and the like. Note that the present invention is not limited to the following explanation, and various changes and modifications can be made by a person having ordinary skill in the art within a scope of technical ideas disclosed in the present specification. Further, in all of the drawings for explaining the present invention, the same reference numeral may be attached to a component having the same function, and repeated explanation may be omitted.

Vehicle Information Display System

FIG. 1(a) is a top view in a case where a vehicle information display apparatus 100 according to one embodiment of the present invention is mounted on, in particular, an automobile among an automobile, an electric train, an airplane, and the like. A windshield 6, a rear window glass 6', side window glasses 6" (collectively referred to also as a "shield glass") exist in front of a driver's seat of an automobile main body 1 as a translucent projected member for projecting and displaying video light. In particular, an inclination angle of the windshield 6 with respect to the vehicle body is different depending upon a type of the vehicle. Moreover, the inventors of the present application researched this radius of curvature in order to realize an optimum virtual image optical system. As a result, as illustrated in FIG. 1(b), the inventors found that in the windshield, the radius of curvature Rh in the horizontal direction parallel to a contact surface of the vehicle is different from the radius of curvature Rv in the vertical direction orthogonal with respect to a horizontal axis, and a relationship below between Rh and Rv generally holds.

$$Rh > Rv$$

Further, it was also found that most of vehicles has this difference between the radii of curvature, that is, the Rh with respect to Rv in a range from 1.5 times to 2.5 times.

The present invention relates to a system in which when a driver drives his or her own vehicle, the driver or a passenger inside the vehicle is caused to monitor video information via at least one of the windshield 6, the rear window glass 6', and the side window glasses 6" as a projected member constituting a part of the vehicle, and the video information can be displayed to the outside of the vehicle. As a result, the driver or the passenger can monitor the video information inside the vehicle by appropriately displaying necessary information in a display region such as the windshield 6, but it is impossible to monitor the information from the outside of the vehicle. Alternatively, the video information can also be displayed to the outside of the vehicle via the rear window glass 6' or the side window glasses 6" (which may include the windshield 6), whereby this displayed information can be monitored from the outside of the vehicle. However, it cannot be monitored from the inside of the vehicle. Thus, this does not prevent the driver or the passenger from monitoring an outside landscape, and does not interfere with driving.

Figure 15:
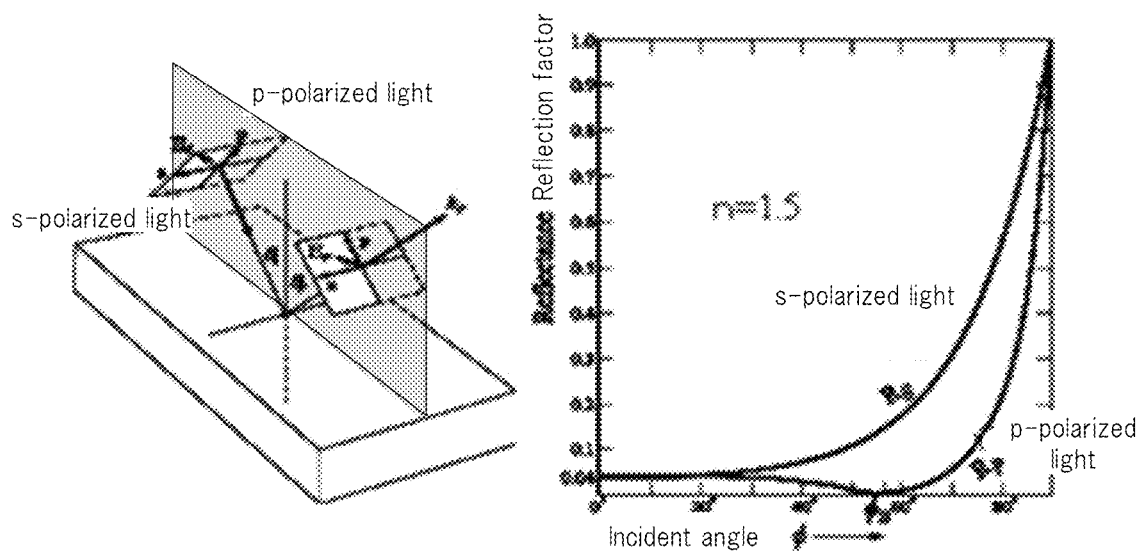
FIG. 15 is a schematic view for explaining a change in a reflection factor of glass depending upon an incident angle between qS-polarized light and P-polarized light.
Figure 16:
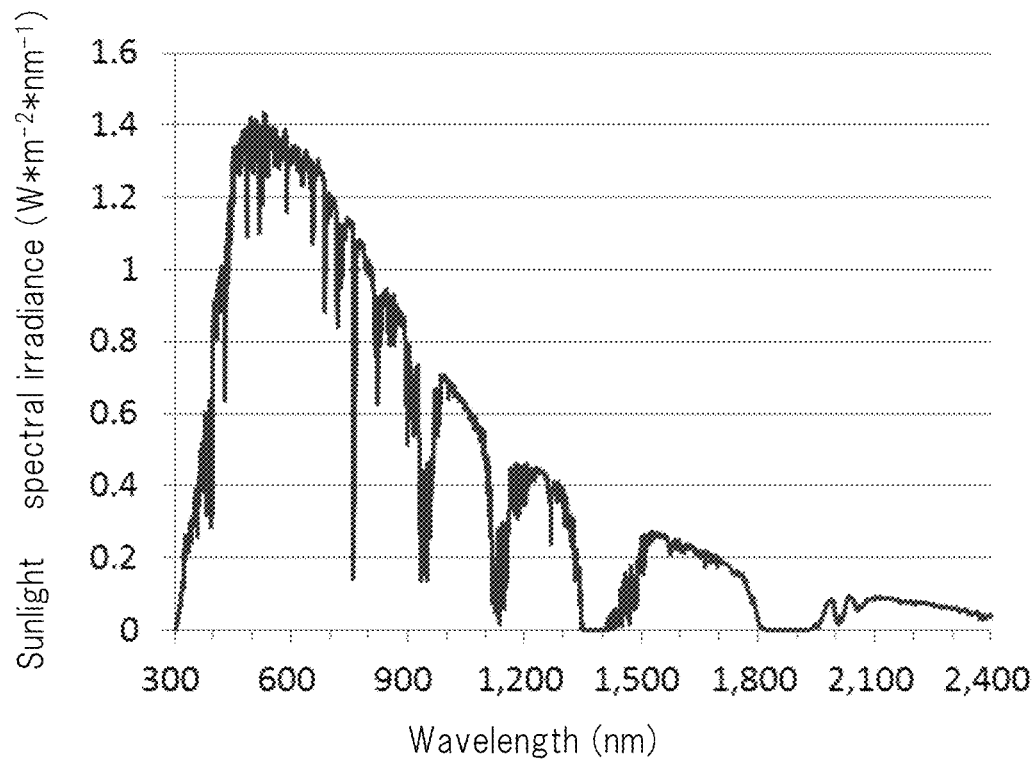
FIG. 16 is a view illustrating a spectral irradiance of sunlight.

Further, as illustrated in FIG. 16, natural light such as sunlight is not only light with a wide wavelength range from ultraviolet rays to infrared rays, but also, with respect to polarization directions, exists in a state where lights with two types of polarization directions (hereinafter, referred to as "S-polarized light" and "P-polarized light"), which include light of a vibration direction perpendicular to a traveling direction of the light and light of a horizontal direction thereto, are mixed. In particular, in a range where an incident angle on the windshield 6 exceeds 50°, as illustrated in FIG. 15, a reflection factor on a glass surface differs depending upon each of the S-polarized light, the P-polarized light, and the incident angle.

Therefore, in the present embodiment, on the basis of the knowledge of the inventors described above, that is, by considering that most of the sunlight entering through the windshield 6 is a P-polarized light component, the inventors confirmed that, in order to suppress outside light including the sunlight entering an information display apparatus, it is particularly effective to reduce a P wave component, and in addition, it is effective to use an S wave component as video light projected from the information display apparatus.

Subsequently, with reference to FIG. 2, a concrete configuration of the vehicle information display apparatus constituting an information display system for vehicle according to the present invention will be described below in detail with reference to the drawings.

Concrete Configuration 1 of Vehicle Information Display Apparatus

FIG. 2 illustrates an overall configuration of the vehicle information display apparatus 100 configured to display video information on a part of an external landscape monitored by the driver via the windshield 6 that is the transparent projected member constituting a part of the vehicle. Here, the windshield 6 is divided into a plurality of areas; video light from a video display apparatus (or a video projecting apparatus) 48 is diffused and reflected to a part of the areas (in the present embodiment, a lower portion of the windshield 6) by the windshield 6; and the driver or the passenger directly monitors the reflected image in one direction. As a result, the driver or the passenger is allowed to monitor necessary information by appropriately displaying it in the display region of the windshield 6, but it is impossible to visually recognize the information from the outside of the vehicle.

In the vehicle information display apparatus 100, as illustrated in FIG. 2, the video display apparatus 48 displays video on the windshield 6 by projecting map information with high resolution (video of a video display apparatus with large scale and high resolution) from a smartphone 300 or the like, for example, onto an inner surface of the windshield 6 via a light direction converting panel 54 and a protective cover 50 and reflecting it toward an eye 8 of an observer (or the driver) by means of a transparent sheet (film) 51 provided on a surface of the windshield 6, which will be described later in detail.

Note that in this example, a case where the smartphone 300, which is a high-performance mobile terminal device equipped with a navigation function of providing the map information and the like is used is illustrated as one example. A display screen from the smartphone 300 can be inputted via a wired connecting terminal or wirelessly such as Bluetooth (registered trademark) or Wifi (registered trademark) to display the video. This makes it possible for the driver to monitor video information with high resolution by using the vehicle information display apparatus 100.

Note that although it is not illustrated herein, as well as the video display apparatus 48, the smartphone 300 includes a control unit configured by a CPU (Central Processing Unit), a work memory, and various kinds of solid-state memories such as a RAM and a ROM having functions as information accumulating/storing means. It is natural that the smartphone 300 has a function of generating necessary video and displaying it on a display device thereof (liquid crystal display).

Moreover, a more concrete configuration of the vehicle information display apparatus 100 will be described with reference to FIG. 3. A liquid crystal display panel (video display element) 52 constituting the video display apparatus 48 is configured by a relatively large liquid crystal display panel having a screen size of more than 6 inches, for example. Since a radius of curvature of the windshield 6 often generally differs partially, uneven distortion (in a vertical direction and a horizontal direction) occurs in the displayed video depending upon a spot where the video is reflected. For this reason, distortion correction is required in order to obtain correct video when the reflected image is viewed from the monitoring direction. In order to perform correction at a level where there is no problem in practical use by this distortion correction, resolution of the panel requires 1280×720 dots or more.

Further, the video display apparatus 48 includes a light source apparatus 101 constituting a light source thereof in addition to the liquid crystal display panel 52 described above. FIG. 3 illustrates the light source apparatus 101 below the liquid crystal display panel 52 together with the liquid crystal display panel 52 as a developed perspective view.

Figure 3:
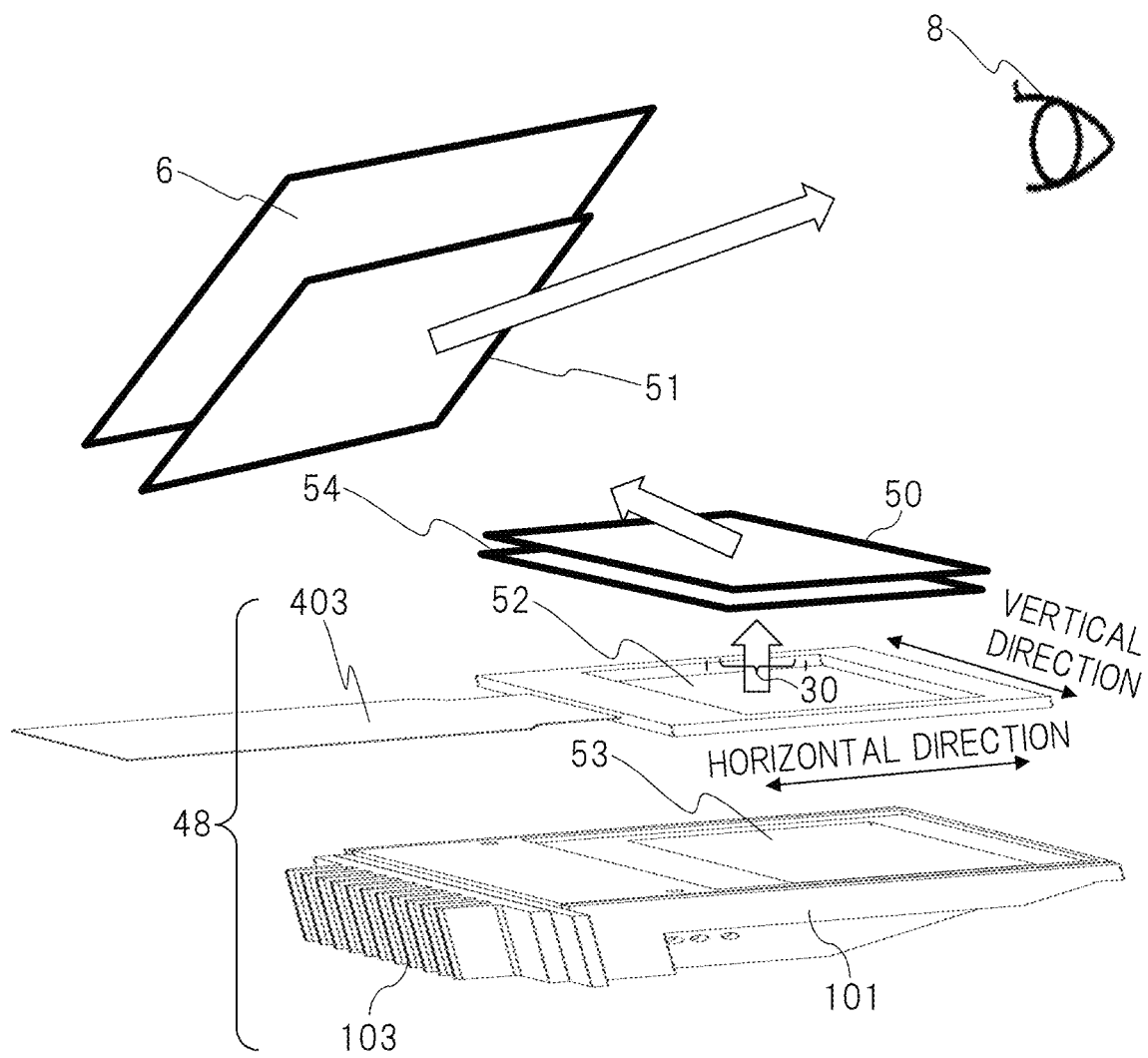
FIG. 3 is a view for explaining a more concrete configuration of the vehicle information display apparatus.

As illustrated in FIG. 3, this liquid crystal display panel (video display element) 52 obtains an illumination light flux with high directivity by the light source apparatus 101, which is a backlight device, and emits video light modulated in accordance with an inputted video signal toward the transparent sheet 51 provided on the windshield 6.

Further, in FIG. 3, the vehicle information display apparatus 100 is configured so as to further include the light direction converting panel 54 configured to control directional characteristics of a light flux 30 emitted from the light source apparatus 101, and a narrow angle diffused plate (if necessary) together with the liquid crystal display panel 52 constituting the video display apparatus 48. Namely, polarizing plates are provided on both surfaces of the liquid crystal display panel 52, whereby it is configured so that light intensity of video light having a specific polarized wave is modulated by the video signal and the video light is emitted. As a result, the video with high resolution from the smartphone 300 or the like (the video of the video display apparatus with large scale and high resolution) is projected toward the windshield 6 via the light direction converting panel 54, and is reflected toward the eye 8 of the observer (or the driver) via the transparent sheet 51 provided on the surface thereof.

Figure 4:
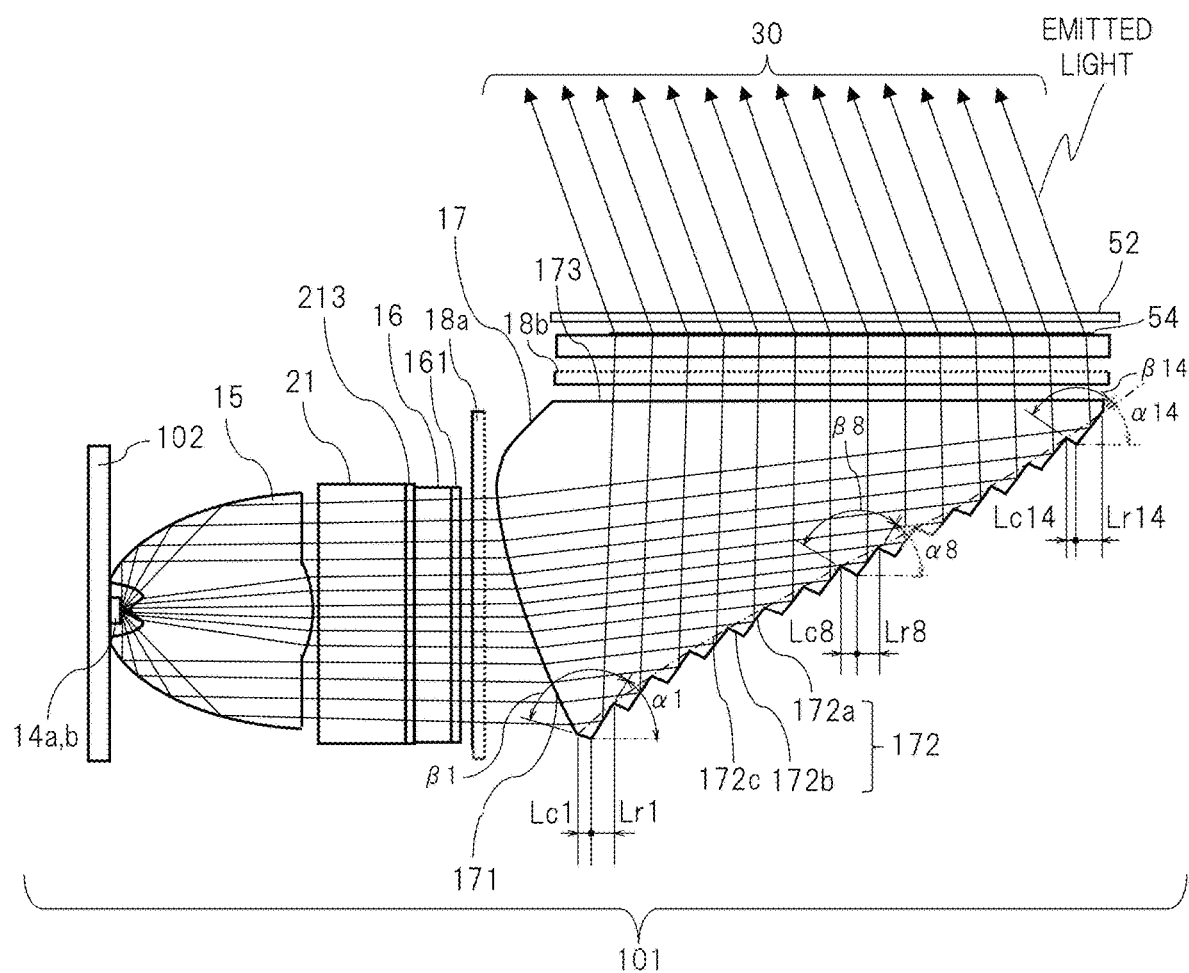
FIG. 4 is a view illustrating a detailed configuration of a light source apparatus in a video projecting apparatus constituting the vehicle information display apparatus.

Note that as illustrated in FIG. 4, the light source apparatus 101 is configured by a case (see FIG. 3) formed by plastic or the like, for example, of the light source apparatus 101 in which an LED element, a collimator, a synthetic diffusion block, alight guide element, and the like, which will be described later in detail, are housed therein. The liquid crystal display panel 52 constituting the video display apparatus 48 is attached to a top surface of the light source apparatus 101. Further, LED (Light Emitting Diode) elements 14a, 14b, which are semiconductor light sources, and an LED substrate 102 on which a control circuit thereof is mounted are attached to one side surface of the case of the light source apparatus 101. A heat sink 103, which is a member for cooling heat generated by the LED element and the control circuit described above, is attached to an outer surface of the LED substrate 102 (see FIG. 3).

On the other hand, the video display apparatus 48 attached to the top surface of the case of the light source apparatus 101 is configured by a liquid crystal display panel frame, the liquid crystal display panel 52 attached to the frame, an FPC (Flexible Printed Circuits: flexible wiring board) 403 electrically connected to the liquid crystal display panel 52 (see FIG. 3), and the like. Namely, the liquid crystal display panel 52, which is a liquid crystal display element, generates display video together with the LED elements 14a, 14b, which are solid light sources, by modulating intensity of transmitted light on the basis of a control signal from a control circuit (herein, not illustrated in the drawings) constituting an electronic device. This will be described later in detail.

Subsequently, a configuration of the light source apparatus 101, that is, one example of the optical system housed in the case of the light source apparatus will hereinafter be described in detail with reference to FIG. 4 and FIG. 5.

FIG. 4 and FIG. 5 illustrate a plurality (in the present embodiment, two) of LED elements 14a, 14b constituting the light source. These are respectively attached at predetermined positions with respect to LED collimators 15. Note that each of these LED collimators 15 is formed f translucent resin such as acryl, for example. As illustrated in FIG. 5(b), each of the LED collimators 15 has a conical convex-shaped outer peripheral surface 156 obtained by rotating a parabolic cross section, and a concave portion 153 in which a convex portion (that is, convex lens surface) 157 is formed at a central portion of an apex of the LED collimator 15. Further, the LED collimator 15 has a convex lens surface (or a concave lens surface recessed inward) 154 that protrudes outward at a central portion of a flat surface portion of the LED collimator 15. Note that the parabolic surface 156 forming the conical-shaped outer peripheral surface of the LED collimator 15 is set within an angle range within which the light emitted from the LED element 14a in a peripheral direction can totally be reflected by the inside thereof, or a reflective surface is formed.

On the other hand, the LED elements 14a, 14b are respectively arranged at predetermined positions on a surface of a circuit board thereof, that is, the LED substrate 102. The LED element 14a or the LED element 14b on the surface of the LED substrate 102 is arranged and fixed thereon so as to be located at a central portion of the corresponding concave portion 153 with respect to the LED collimator 15.

According to such a configuration, by the LED collimator 15 described above, of light emitted from the LED element 14a or the LED element 14b, in particular, light emitted upward (a right direction of FIG. 4) from the central portion thereof is focused by the two convex lens surfaces 157, 154, which form an outer shape of the LED collimator 15, to become parallel light. Further, light emitted toward the peripheral direction from the other portion thereof is reflected by the parabolic surface, which forms the conical-shaped outer peripheral surface of the LED collimator 15, and is similarly focused to become parallel light. In other words, according to the LED collimator 15 that constitutes the convex lens at the central portion thereof and forms the parabolic surface in the peripheral portion thereof, it becomes possible to take out almost all the light generated by the LED element 14a or the LED element 14b as the parallel light, and this makes it possible to improve usage efficiency of the generated light.

Note that a polarization converting element 21, which will be described below in detail, is provided at a light emission side of the LED collimator 15. As is clear from FIG. 5(a), this polarization converting element 21 is configured by combining translucent members each of which has a columnar shape whose cross section is a parallelogram (hereinafter, referred to as "parallelogram prisms") and translucent members each of which has a columnar shape whose cross section is a triangle (hereinafter, referred to as "triangular prisms") and arranging them in an array in parallel with a plane orthogonal to an optical axis of the parallel light from the LED collimator 15. Moreover, a polarization beam splitter (hereinafter, abbreviated as "PBS") film 211 and a reflective coat 212 are alternately provided on interfaces between the adjacent translucent members arranged in the array. Further, a ½λ phase plate 213 is provided on an emission surface of the polarization converting element 21 from which light, which enters the polarization converting element 21 and transmits the PBS film 211 is emitted.

Moreover, a rectangular synthetic diffusion block 16 illustrated in FIG. 5(a) is also provided on the emission surface of this polarization converting element 21. Namely, the light emitted from the LED element 14a or the LED element 14b becomes the parallel light by the action of the LED collimator 15 to enter the synthetic diffusion block 16, and reaches a light guide element 17, which will be described below, after being diffused by a texture 161 provided at the emission side.

The light guide element 17 is a member formed into a rod shape whose cross section is substantially a triangle (see FIG. 5(b)), for example, and is made of translucent resin such as acryl. As is clear from. FIG. 4 and FIG. 5, the light guide element 17 includes: a light guide element light entering portion (light guide element light incident surface) 171 that faces an emission surface of the synthetic diffusion block 16 via a first diffused plate 18a; a light guide element light reflecting portion (light guide element light reflective surface) 172 that forms a slope; and a light guide element light emitting portion (light guide element light emission surface) 173 that faces the liquid crystal display panel 52 of the liquid crystal display element via a second diffused plate 18b.

As illustrated in FIG. 4, a large number of reflective surfaces 172a and a large number of connecting surfaces 172b are alternately formed in a sawtooth shape on the light guide element light reflecting portion 172 of this light guide element 17. The reflective surfaces 172a (that is, a line segment rising to the right in the drawings) forms an angle αn (n: a natural number t, for example, 1 to 130 in the present embodiment) with respect to a horizontal plane indicated by an alternate long and short dash line in FIG. 4. Here, as one example thereof, the angle αn is set to 43° or less (however, 0° or more).

The light guide element light entering portion 171 is formed in a curbed convex shape inclined toward the light source side. According to this, parallel light from the emission surface of the synthetic diffusion block 16 is diffused through the first diffused plate 18a to enter the light guide element 17. As is clear from FIG. 4, the parallel light reaches the light guide element light reflecting portion 172 while being slightly bent (or deflected) upward by the light guide element light entering portion 171, and is reflected here to reach the liquid crystal display panel 52 provided on an upper emission surface.

As described above in detail, according to the video display apparatus 48 of the vehicle information display apparatus 100 described above, it is possible to further improve the light usage efficiency and even illumination characteristics thereof, and at the same time, it becomes possible to manufacture the vehicle information display apparatus 100 including the light source apparatus for a modularized S-polarized wave in a small size and at low cost. Note that although the case where the polarization converting element 21 is attached after the LED collimator 15 has been described in the above explanation, the present embodiment is not limited thereto. It will be obvious to a person having ordinary skill in the art that similar actions and effects can be obtained by providing the polarization converting element 21 on an optical path leading to the liquid crystal display panel.

Note that the large number of reflective surfaces 172a and the large number of connecting surfaces 172b are alternately formed in the sawtooth shape in the light guide element light reflecting portion 172, and an illumination light flux is totally reflected on each of the reflective surfaces 172a to travel upward. Moreover, by providing the narrow angle diffused plate in the light guide element light emitting portion 173, the illumination light flux enters the light direction converting panel 54 configured to control the directional characteristics thereof as a substantially parallel diffuse light flux to enter the liquid crystal display panel 52 from an oblique direction. In the present embodiment, the light direction converting panel 54 is provided between the light guide element light emission surface 173 and the liquid crystal display panel 52. However, it goes without saying that the similar effects can be obtained even though the light direction converting panel 54 is provided on the emission surface of the liquid crystal display panel 52.

Light Direction Converting Panel

Figure 6:
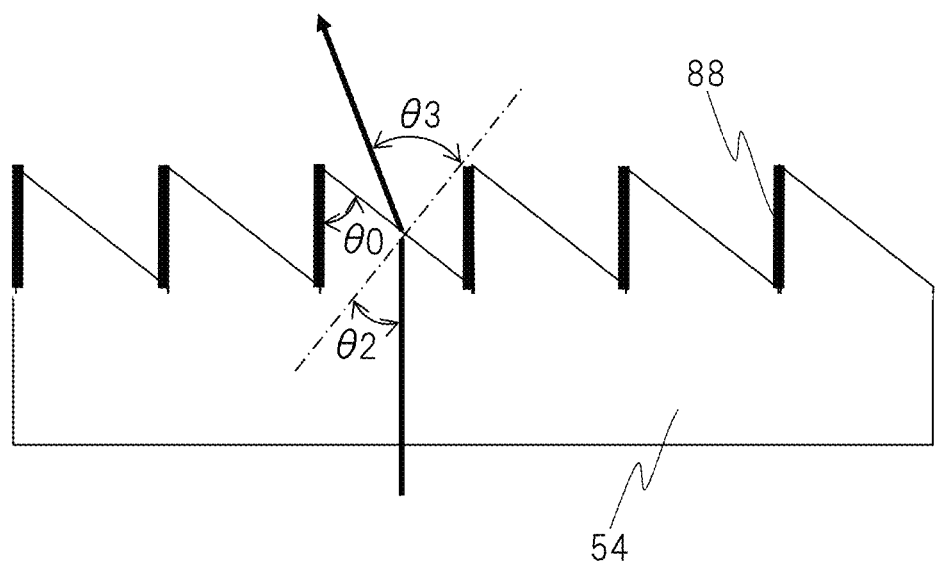
FIG. 6 is a view for explaining a principle of a light direction converting panel constituting the vehicle information display apparatus.

FIG. 6 is a schematic explanatory drawing for explaining a principle of the light direction converting panel 54, which constitutes a part of the vehicle information display apparatus 100 according to one embodiment of the present invention, provided in an upper surface of the video display apparatus 48 described above. The light flux from the light guide element 17 of the light source apparatus 101 described above enters the light direction converting panel 54 from an incident surface thereof (that is, a lower surface in FIG. 4), and is refracted in a desired direction θ3 by means of a lens action of a linear Fresnel lens provided on an emission surface thereof (that is, a top surface in FIG. 4). At this time, the desired direction θ3 is uniquely derived from Snell's law by an incident angle θ2 of the light flux on the Fresnel lens, a Fresnel angle θ0 of the Fresnel lens, and a refractive index n of the substrate.

As a result, it is possible to give directivity for a desired direction to a substantially parallel light flux from the light guide element. Namely, the video light, which is light from the liquid crystal display panel 52 constituting the information display apparatus 48, travels toward the transparent sheet 51 provided in the windshield 6, which will be described below, without being visually recognized by the driver or the passenger inside the vehicle. Then, the video light is essentially reflected and diffused in one direction by the transparent sheet 51, whereby a reflected image thereof is visually recognized by the driver.

Namely, by this light direction converting panel 54, the video light from the video display apparatus 48 (see FIG. 2 or FIG. 3) itself is not visually recognized directly from the inside of the vehicle. For that reason, only the reflected image by the reflected light is monitored by the driver or the passenger without interfering with the driving. Note that by providing a light absorbing paint or a pigment on each of connecting surfaces 88 of the Fresnel lens, light other than the light flux traveling in the desired direction is suppressed from being generated. As a result, since unnecessary light is not mixed with the video light reflected by the window glass, imaging performance is not impaired.

Protective Cover

Figure 7:
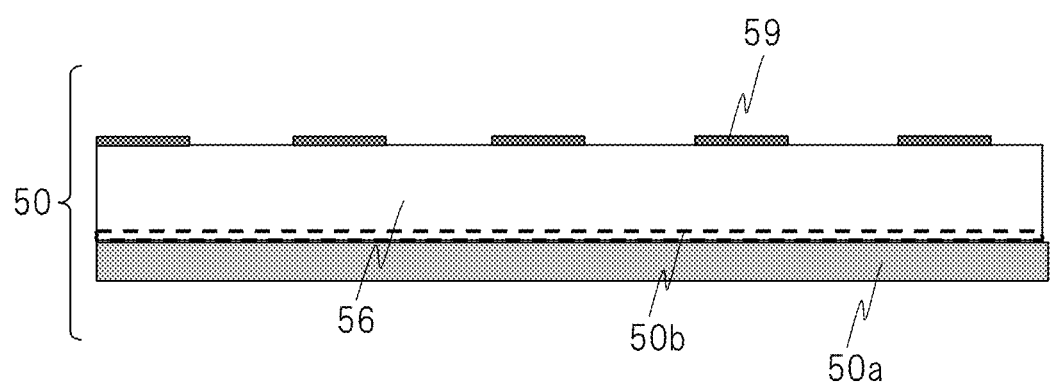
FIG. 7 is a transverse sectional view illustrating a schematic configuration of a protective cover constituting the vehicle information display apparatus.

FIG. 7 is a transverse sectional view illustrating a schematic configuration of the protective cover 50 in contact with a dashboard 47 and provided on a top surface of the light direction converting panel 54. Black stripes 59 are provided on a part of a light emission side of a substantially transparent substrate 56. In order to reduce surface reflection of outside light containing the sunlight, a paint containing carbon black as a black paint may be used for the black stripes 59. Further, by providing antireflection coating at portions where no black stripe is provided in order to suppress surface reflection, the reflection of the outside light at a surface of the protective cover 50 is reduced significantly, and this reduces an obstacle due to reflection of the outside light when the driver drives the own vehicle. On the other hand, in order to enhance shading performance against the sunlight, the antireflection coating may be caused to have a property of reflecting near infrared light and infrared light.

On the other hand, a membrane or film 50a configured to absorb or reflect the P wave component of a sunlight flux is formed or adhered on a light incident side of the substantially transparent substrate 56. As a result, since the P wave component of the sunlight does not enter the video display apparatus 48, reliability regarding light resistance and heat resistance is improved significantly. On the other hand, the membrane or film 50a also has characteristics of a filter configured to selectively transmit video light of an S polarized wave outputted from the video display apparatus 48, contrast performance of the obtained video is improved significantly.

Note that a video source constituting the video display apparatus 48 described above is the liquid crystal display panel 52. Therefore, in a case where the driver wears polarized sunglasses, a problem that the specific polarized wave is blocked and video cannot thus be viewed. In order to prevent this, a wave plate 50b such as a λ/4 plate, a λ/8 plate, or a λ/16 plate is arranged between the membrane or film 50a and the substrate 56 in the protective cover 50 provided at a light emission side of the video display apparatus 48. By providing the wave plate 50b, it is preferable to align the polarization directions of the light flux in a specific direction; set the video light as an optimal polarization angle; and shift a polarizing axis with the polarization direction of the polarized sunglasses by a derided amount.

On the other hand, even with the same polarized light, by rotating an absorption axis to shift an absorption axis of the polarizing plate at a liquid crystal panel emission side by 30° or more with respect to the absorption axis of the polarized sunglasses, for example, the absorption becomes about 50%. This makes it possible to solve the problem in which the video cannot be viewed.

Further, when the polarizing axis is rotated to approach circularly polarized light, the polarizing axis of the video light from the information display apparatus 48 rotates from the S-polarized light. For this reason, a reflection factor by the windshield 6 decreases and brightness of the video decreases. Therefore, it is preferable to balance the two.

Unidirectional Transparent Sheet

Figure 8:
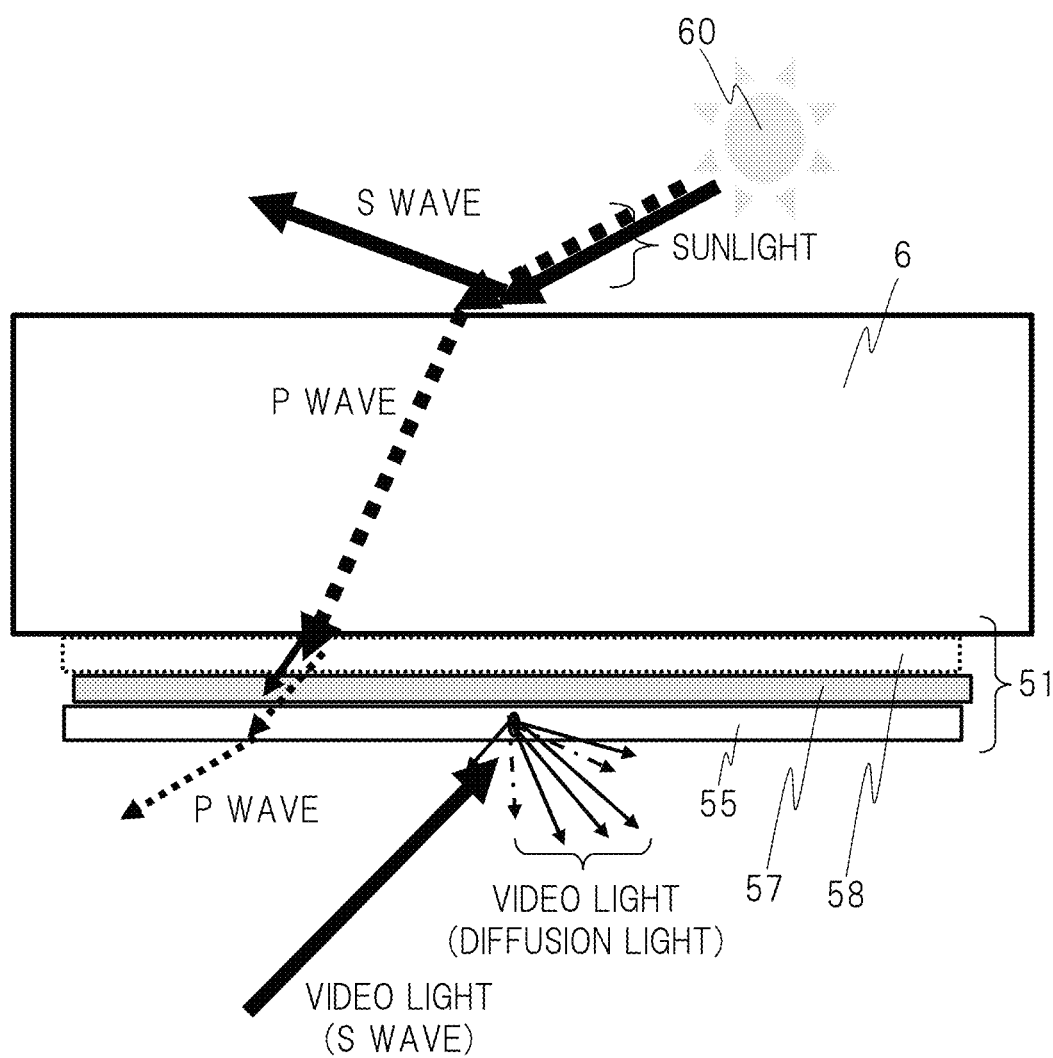
FIG. 8 is a view for explaining a configuration and an operation of a unidirectional transparent sheet constituting the vehicle information display apparatus.

Next, a configuration and an operation of the transparent sheet 51 will be described with reference to FIG. 8. An S polarized wave of sunlight that enters the windshield 6 (horizontally arranged for convenience of explanation) in an oblique direction is reflected, and a P polarized wave thereof transmits the windshield 6 to travel toward the transparent sheet 51. The transparent sheet 51 is configured by a polarizing plate 57 configured to transmit the S wave, a transparent diffusion sheet member 55, and a phase difference plate (or retardation plate) 58. This transparent sheet 51 is transparent in a case where video is not displayed by using a film obtained by being stretched while thermoplastic polymer in which nanoparticle zirconium or nanoparticle diamond having a large refractive index is dispersed is melted, for example, "KALEIDO SCREEN" manufactured by JXTG Nippon Oil & Energy Corporation (see Patent document 3 described above). This does not prevent the driver from monitoring scenery of the outside world (outside the vehicle). On the other hand, when video is displayed, the transparent sheet 51 diffuses and reflects the video light. This makes it possible to realize unidirectional display by which the driver or the passenger can be caused to visually recognize video information. At this time, if opacity or cloudiness (HAZE) defined by a ratio of diffuse transmittance and parallel light transmittance of the transparent sheet 51 is 10% or less, there is no problem in practical use. However, it is preferable that it is 4% or less. On the other hand, HAZE of a window glass for an automobile is 2% or less.

Since the video light from the video display apparatus 48 is the S polarized wave, the video light is scattered by the inside of the transparent diffusion sheet member 55 described above in a state where a reflection factor when being obliquely entered, and is emitted toward the observer. On the other hand, the polarization direction of part of the video light is disturbed by scattering, the part of the video light is diffused and transmitted by the transparent diffusion sheet member 55 to be emitted toward the windshield 6. Since a difference of refractive indices is small on the incident surface of the windshield 6, a level of a double image generated by the reflected light is low. On the other hand, intensity of the reflected light generated on an emission surface (that is, a surface in contact with the outside world) of the windshield 6 has a large reflection factor because the S-polarized light component is the majority. Since the video light reflected by this surface passes through the polarizing plate 57 again and is absorbed after reflection, the video light does not return to the observer side. For this reason, since a double image that may be generated by the video reflected by the windshield 6 is not generated, image quality is improved significantly. Similarly, it goes without saying that the similar effects can be obtained even though the transparent sheet 51 described above is attached to a combiner as a reflective surface for the video in place of the windshield 6.

According to the transparent sheet 51 described above, as illustrated in FIG. 8, by absorbing sunlight components of the P-polarized light, which passes through the windshield (then, also passes through a combiner in a combiner system) under a predetermined condition of daytime in front of the vehicle information display apparatus 100, the light direction converting panel 54 and the protective cover 50 provided on a top surface thereof, it becomes possible to prevent it from returning to the liquid crystal display panel and the polarizing plate.

Information Display System for Vehicle

According to the information display system for vehicle provided with the vehicle information display apparatus 100 described above in detail, as indicated by an arrow in FIG. 3, the large video display apparatus 48 with high resolution is provided at a position (see FIG. 2) of the dashboard 47 corresponding to a video display region of a lower end region of the windshield 6 that is the shield glass, and the displayed video is reflected by the windshield 6, whereby it becomes possible to cause the driver or the passenger to directly monitor the reflected image.

FIG. 9 illustrates one example of arrangement in a cockpit of the automobile in which the vehicle information display apparatus 100 according to the present embodiment, which includes the video display apparatus 48 and the transparent sheet 51 as described above, is arranged. FIG. 9(a) illustrates a system corresponding to an automobile in which a steering is disposed at a left side, and FIG. 9(b) illustrates a system corresponding to an automobile in which a steering is disposed at a right side. The video information is reflected by the windshield 6 by using the vehicle information display apparatus 100, and the driver is caused to monitor the reflected image in an image display region of FIG. 9 (corresponding to an area to which the transparent sheet 51 is attached). At that time, it is preferable to set the image display region to a range or an area that does not interfere with the driver's monitoring of a landscape outside the vehicle such as a range where a hood of the own vehicle indicated by a broken line in FIG. 9 is monitored, for example.

As illustrated in FIG. 9, the vehicle information display apparatus 100 described above is arranged in order from the windshield 6 to the video display apparatus 48 toward a steering 43 inside the dashboard 47 between the windshield 6 and the steering 43. As a result, when the driver drives the own vehicle, by reflecting video of the video display apparatus with large scale and high resolution by the windshield 6 to the landscape of the outside monitored through the windshield 6, that is, a partial area of the windshield 6 by means of the vehicle information display apparatus 100, it is possible to provide the information display system for vehicle by which the driver or the passenger can monitor the reflected image.

Note that a camera 72 configured to monitor a state of the driver and a state of the inside of the automobile is provided on a rearview mirror 71 illustrated in FIG. 9. For example, it may be possible to control an emission direction of the video light from the information display apparatus described above in accordance with a height of eyes of the driver.

Figure 10:
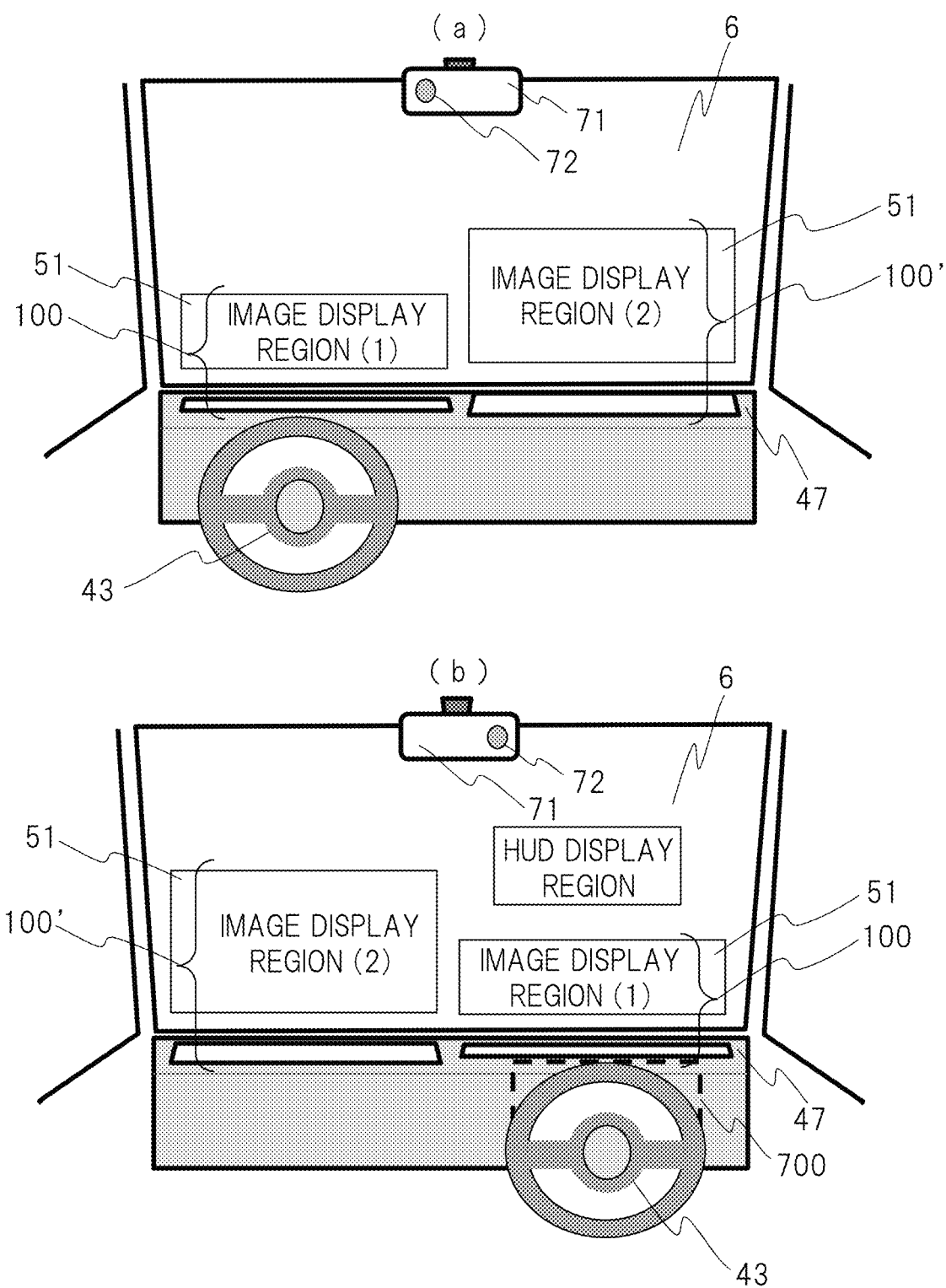
FIG. 10 is a view illustrating one example of arrangement in the cockpit of the automobile in which the vehicle information display apparatus is arranged.

FIG. 10 is a schematic view illustrating an example of a system for providing video information to a passenger on a front passenger's seat in addition to the vehicle information display apparatus 100 described above, and a system in which a head up display (HUD) apparatus is also mounted (FIG. 10(b)). As well as FIG. 9, FIG. 10(a) illustrates a system corresponding to an automobile in which the steering 43 is arranged at a left side, and FIG. 10(b) illustrates a system corresponding to an automobile in which the steering 43 is arranged at a right side.

FIG. 10(a) illustrates an example in which a second vehicle information display apparatus 100' is also mounted at a front passenger's seat side in addition to the vehicle information display apparatus 100 at the driver's seat side described above, and an image display region (2) that can be monitored by the passenger is set at a partial area (right side of FIG. 10) of the windshield 6 together with an image display region (1) that can be monitored by the driver. In addition, FIG. 10(b) illustrates an example in which a head up display (HUD) type information display apparatus (head up display apparatus, hereinafter, referred to as an "HUD apparatus") 700 is also mounted; an image display region (2) is set for the passenger; and an HUD display region by the HUD apparatus 700 is set for the driver in addition to an image display region (1) by the information display apparatus 48.

Note that a known general apparatus can be adopted as the HUD apparatus 700, and here, an outline thereof will be described below as one example thereof.

Figure 11:
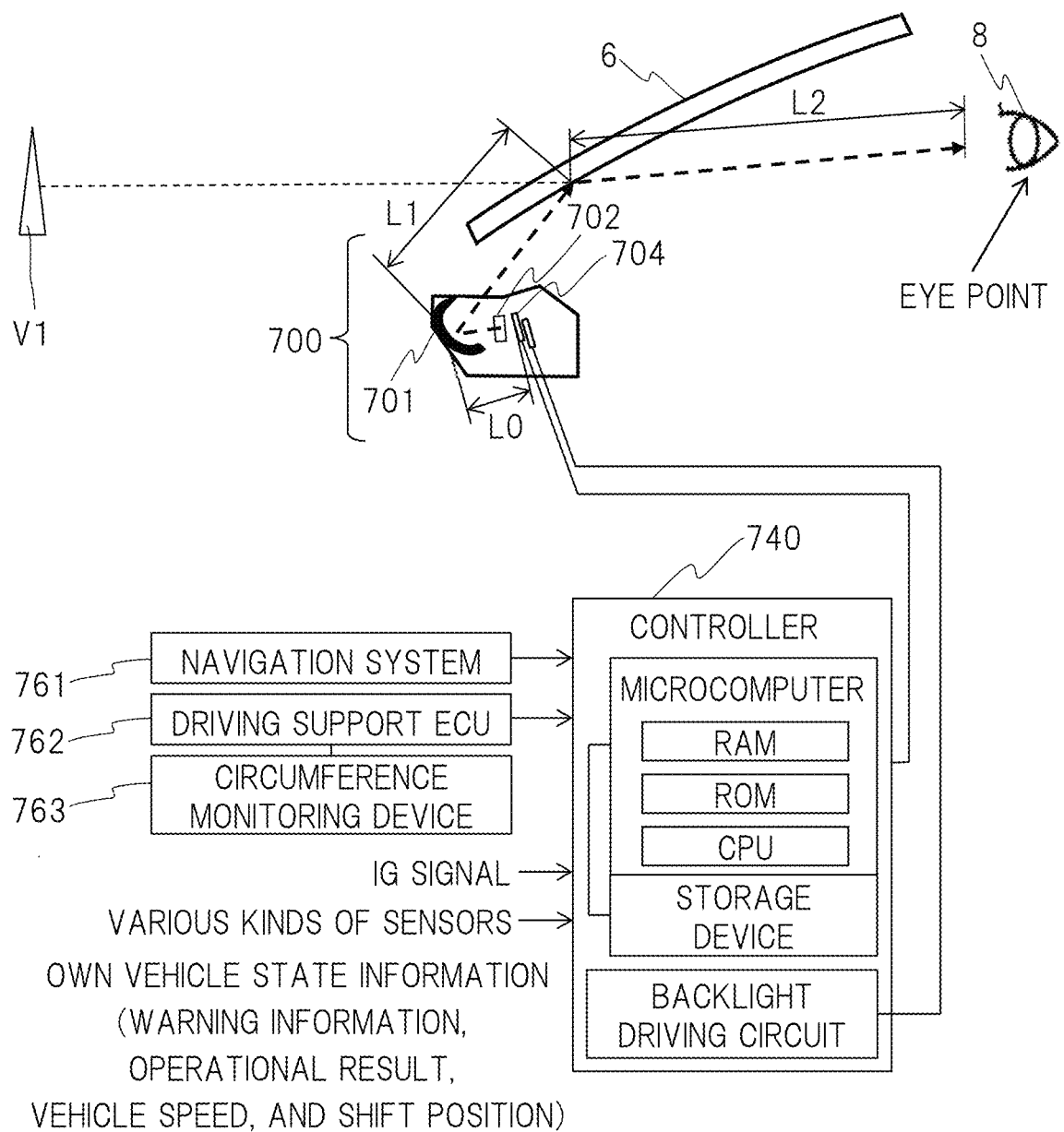
FIG. 11 is a view illustrating a schematic configuration of an HUD type information display apparatus constituting the information display system for vehicle according to one embodiment of the present invention.

FIG. 11 is a schematic configuration view illustrating the HUD apparatus 700 so as to include a configuration of a peripheral equipment thereof. Here, since a virtual image V1 is formed in front of the own vehicle in a line of sight 8 of the driver (eye point), various kinds of information reflected by a projected member 6 (an inner surface of the windshield) are displayed as a virtual image VI (Virtual Image).

The HUD apparatus 700 includes a video display apparatus 704, a concave (free-form surface) mirror 701, and a lens element 702 for correction. The video display apparatus 704 is configured to project video light to display information. The lens element 702 for correction is configured to correct distortion and/or aberration that occurs when a virtual image is formed by the concave mirror 701 from video displayed by the video display apparatus 704. A video light flux from this information display apparatus 700 is emitted from an opening (not illustrated in the drawings) toward the windshield 6.

Further, the HUD apparatus 700 also includes the video display apparatus 704 and a controller 740 configured to control a backlight thereof. Note that optical components including the video display apparatus 704 and the backlight are a virtual image optical system, and includes the concave mirror 701 that reflects light. Further, the light reflected by these optical components is reflected by the windshield 6, which is the projected member, to go toward the line of sight 8 of the driver. Note that as the video display apparatus 704, for example, there are a light emitting VFD (Vacuum Fluorescent Display) and the like in addition to an LCD (Liquid Crystal Display) having a backlight.

Further, the controller 740 illustrated in FIG. 11 constituting the HUD apparatus 700 obtains, from a navigation system 761, various kinds of information such as a speed limit and the number of lanes of a road corresponding to a current position at which the own vehicle is travelling, and a scheduled movement route of the own vehicle set to the navigation system 761 as foreground information (that is, information to be displayed at a front of the own vehicle by the virtual image described above). Further, a driving support ECU 762 is a controller that realizes driving support control by controlling a drive system and a control system in accordance with an obstacle detected as a result of monitoring by a circumference monitoring device 763. The driving support control includes well-known technologies such as cruise control, adaptive cruise control, pre-crush safety, lane keeping assist, for example. The circumference monitoring device 763 illustrated in FIG. 11 is a device for monitoring a status of a circumference of the own vehicle. As one example, there are a camera that detects an object existing on the circumference of the own vehicle on the basis of an image obtained by photographing the circumference of the own vehicle, an exploratory device that detects an object existing around the own vehicle on the basis of a result obtained by transmitting and receiving an exploratory wave, and the like.

The controller 740 of the HUD apparatus 700 described above obtains such information from the driving support ECU 762 (for example, a distance to a preceding vehicle and a direction of the preceding vehicle, a position at which an obstacle or a traffic sign exists, and the like) as foreground information. Moreover, an ignition (IG) signal and own vehicle state information are inputted to this controller 740. The own vehicle state information among these kinds of information is information obtained as the vehicle information. For example, the own vehicle state information contains warning information indicating to become an abnormal state defined in advance, such as residual quantity of fuel for an internal-combustion engine or temperature of cooling water, which does not require high-resolution display. Further, the own vehicle state information also contains an operational result of a direction indicator, travelling speed of the own vehicle, and shift position information. The controller 740 that has been mentioned above is activated when the ignition signal is inputted thereto. Note that the projected member may be a member to which information is projected, and may be not only the windshield 6, but also be a combiner. It may be anything so long as a virtual image is formed in front of an own vehicle in a line of sight 8 of a driver to cause the driver to visually recognize the virtual image.

Modification Example of Information Display System for Vehicle: Display to Outside According to the embodiment described above in detail, when the driver drives the own vehicle, it becomes possible to cause the driver or the passenger inside the vehicle to display and monitor necessary video information with high resolution in one direction through the windshield 6 as the projected member that is the shield glass constituting the vehicle. Note that at that time, the information cannot be monitored from the outside of the vehicle. However, the information display system for vehicle according to one embodiment of the present invention is not limited to the embodiment described above. In addition, it is also possible to display the video information to the outside of the vehicle. Namely, it is further possible to display the video information to the inside or the outside of the vehicle in the similar manner not only through the windshield 6 described above, but also through the rear window glass 6' or the side window glasses 6", which is the shield glass.

For example, in the information display system for vehicle according to the present embodiment, it is possible to display information indicating a state of a vehicle such as "empty vehicle" at a part of the windshield 6 of a taxi, and further on the rear window glass 6' or the side window glasses 6". Alternatively, it is also possible to display information such as information promotion or information advertisement to the outside of the vehicle. Further, even in a vehicle such as a bus or an electric train, it is possible to display information such as routes and destinations on a windshield, a rear window glass, or a side window glass to the outside of the vehicle in one direction. Hereinafter, a configuration of a vehicle information display apparatus 100" in a case where information is displayed to the outside will be described.

Figure 12:
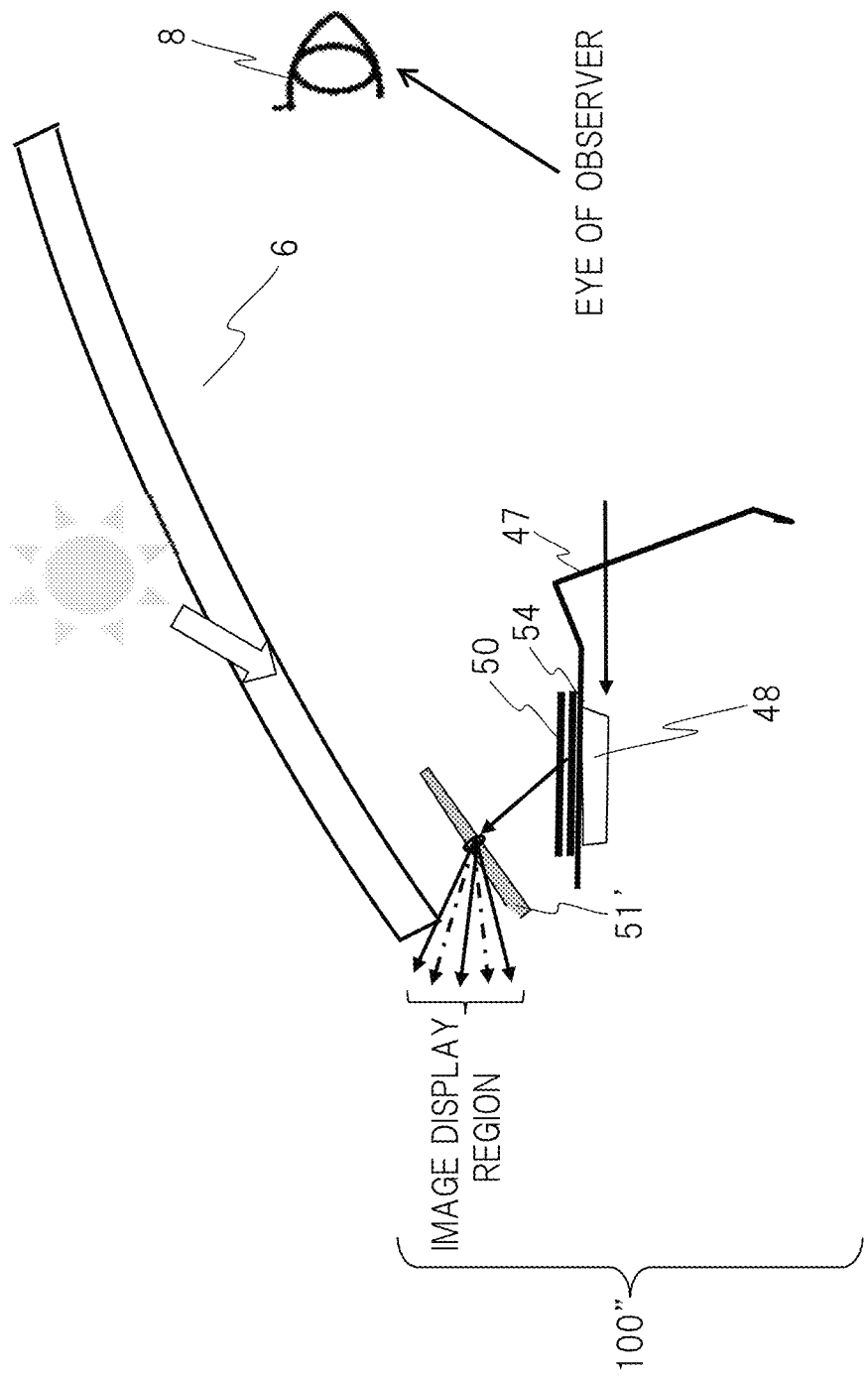
FIG. 12 is a view for explaining a modification example of the information display system for vehicle.

FIG. 12 illustrates a system in which necessary video information is displayed and monitored with high resolution in one direction to the outside of the vehicle via the windshield 6 as the projected member. More specifically, here, FIG. 12 illustrates an example in which a state of a taxi ("empty vehicle" or the like) is displayed to the windshield of the taxi. Note that in this modification example, in the configuration illustrated in FIG. 2, the video light from the video display apparatus 48 is diffused and transmitted through the windshield 6 as a transparent sheet 51' provided on the surface of the windshield 6, and as indicated by an arrow in FIG. 2, a pedestrian or the like can monitor the video by transmitting and displaying the video to the outside of the vehicle, for example. As a result, although necessary information can be displayed on the windshield 6 to the outside of the vehicle for the driver or the passenger, the display does not obstruct monitoring of the landscape outside the vehicle, which is to be monitored from the inside of the vehicle, and this does not obstruct driving of the driver.

Note that as well as the transparent sheet 51, the transparent sheet 51' is configured by a polarizing plate 57 configured to transmit an S wave and a transparent diffusion sheet member 55. Here, the transparent sheet 51' is transparent in a case where video is not displayed by using a film obtained by being stretched while thermoplastic polymer in which nanoparticle zirconium or nanoparticle diamond having a large refractive index is dispersed is melted, for example, "KALEIDO SCREEN" manufactured by JXTG Nippon Oil & Energy Corporation (see Patent document 2 described above). On the other hand, the transparent sheet 51' diffuses and transmits the video light when the video is displayed. This does not cause the driver or the passenger to visually recognize the video information, and does not prevent the driver or the passenger from monitoring scenery outside the vehicle. It becomes possible to realize unidirectional display in which information can be displayed to only the outside.

Figure 13:
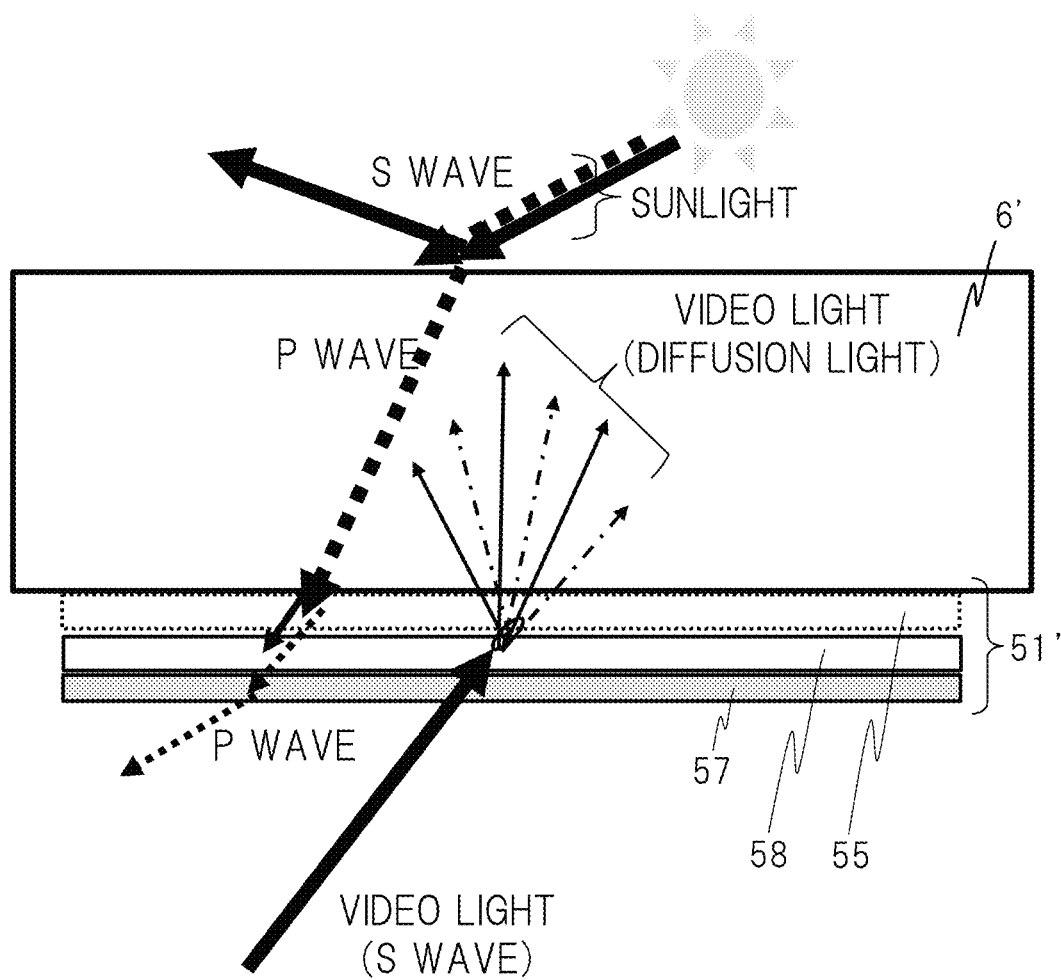
FIG. 13 is a view illustrating an operation by a transparent sheet in the modification example of the information display system for vehicle.

FIG. 13 illustrates an operation by the transparent sheet 51' in this case. As is clear from FIG. 13, the transparent sheet 51' is configured by a polarizing plate 57, a transparent diffusion sheet member 55, and a phase difference plate 58. As well as the transparent sheet 51, an S polarized wave of sunlight that enters from an oblique direction is reflected. On the other hand, by transmitting a P polarized wave, illuminance of the sunlight is reduced. At this time, by rotating a polarizing axis of P-polarized light by the phase difference plate 58, part of the sunlight is absorbed by the polarizing plate 57. As a result, it is possible to disperse damage received due to the sunlight by the video display apparatus 48.

On the other hand, video light that is diffused by an operation of the transparent diffusion sheet member 55 to the outside of the vehicle is reflected by the rear window glass 6' to return to the inside of the vehicle. This light becomes an obstacle to driving because it obstructs a field of view of the driver. Therefore, in the present embodiment, by arranging the phase difference plate 58 between the rear window glass 6' and the polarizing plate 57 to absorb the reflected light by the polarizing plate 57, information by the video light is not visually recognized by the driver or the passenger inside the vehicle, and is displayed toward the outside of the vehicle in one direction. At that time, the information by the video light does not obstruct monitoring of the landscape outside the vehicle by the driver or the passenger inside the vehicle to obstruct the driving. If opacity or cloudiness (HAZE) defined by a ratio of diffuse transmittance and parallel light transmittance of the transparent sheet 51' described above is 10% or less, there is no problem in practical use. However, it is preferable that it is 4% or less. On the other hand, HAZE of a window glass for an automobile is 2% or less.

Note that as described above, the display of the information to the outside of the vehicle by using a part of the shield glass that is the windshield 6, the rear window glass 6', or the side window glasses 6" would be suitable to display information such as the "empty vehicle" indicating an empty state of a taxi to a pedestrian or the like, for example. Further, as described above, the vehicle information display apparatus according to one embodiment of the present invention can not only displays video information on the windshield 6 in one direction, but also display various kinds of information containing promotion, advertisement, and notification by using the projected member such as the rear window glass 6' or the side window glasses 6" (see FIG. 1), which is the shield glass constituting the vehicle in a large vehicle such as a bus or an electric train, for example. Hereinafter, a configuration and an operation of the information display system for vehicle in a case where information is displayed to the outside of the vehicle will be described.

Figure 14:
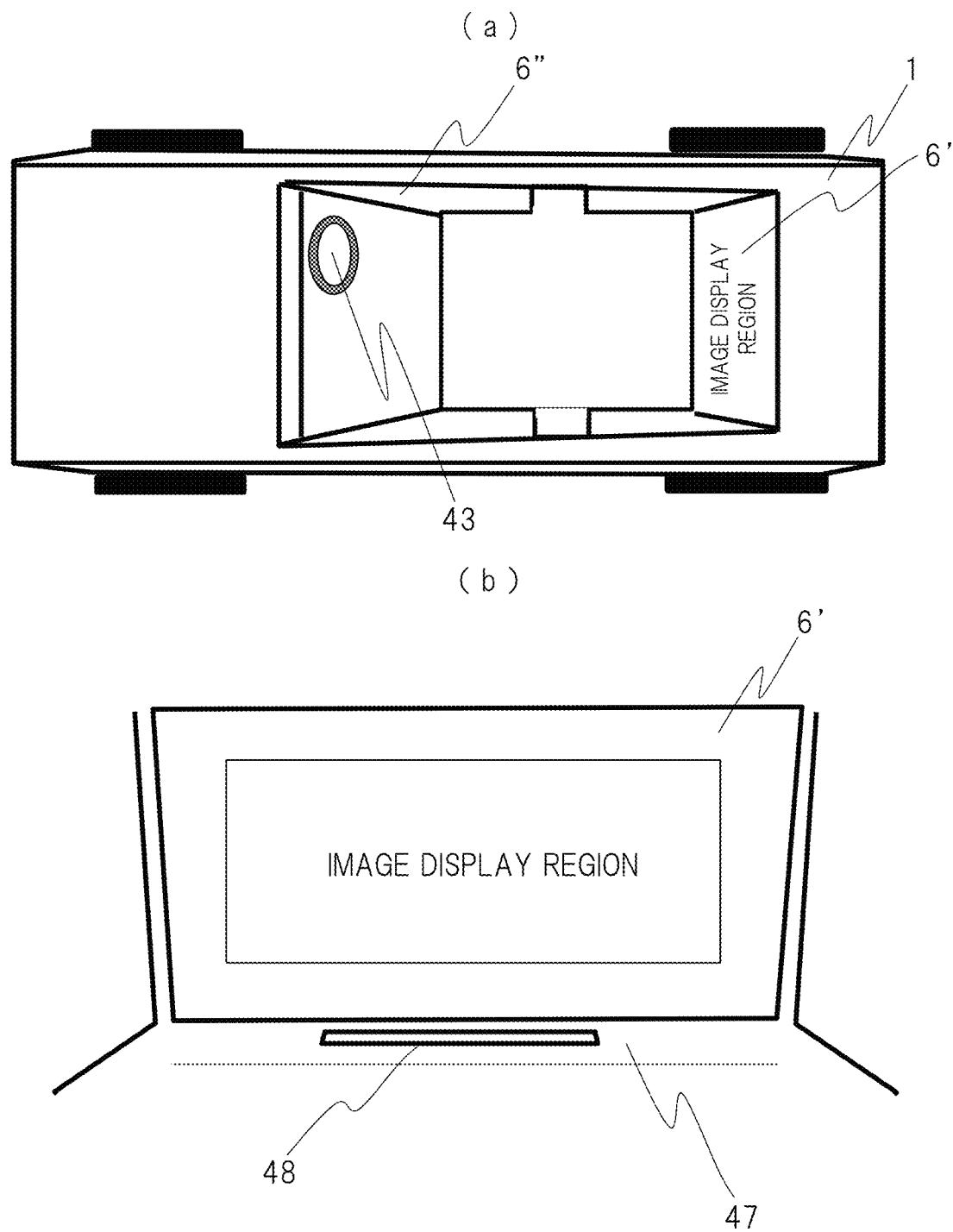
FIG. 14 is a view for explaining another modification example of the information display system for vehicle.

FIG. 14 is a view in which as another modification example, information to a pedestrian or the like outside the vehicle is displayed as a projected member constituting a part of a vehicle through the rear window glass 6' constituting a vehicle 1, for example. As a result, the driver or the passenger can monitor necessary information on the windshield 6 described above (see FIG. 9), and at the same time, the information can be displayed through the rear window glass 6' to the outside of the vehicle. Note that the driver or the passenger cannot monitor the information displayed to the outside. For that reason, this does not obstruct the field of view of the driver. Namely, the display of information to the outside of the vehicle does not obstruct monitoring of landscape of the outside by the driver or the passenger inside the vehicle.

In this example, as illustrated in FIG. 14(*a*) and FIG. 14(*b*), the video display apparatus 48 is arranged below the rear window glass 6' that is the projected member constituting a part of the vehicle, and video light thereof is projected toward the image display region set to the entire surface or apart of the rear window glass 6', thereby displaying the video information.

Note that even in this example, it is natural to set the transparent sheet 51' illustrated in FIG. 13 described above in the image display region of the rear window glass 6'. In addition, the projected member that displays the video information toward the outside of the vehicle in one direction is not limited to the windshield 6 and the rear window glass 6' described above. In addition, for example, it is possible to use the side window glasses 6" (see FIG. 1) constituting a side surface of the vehicle. In that case, it is natural that, although it is not illustrated herein, the video display apparatus 48 is arranged in the member in the vicinity of the side window glasses 6" (for example, a part of an adjacent ceiling surface or an adjacent window frame), and the transparent sheet 51' illustrated in FIG. 13 is provided in the image display region of the side window glasses 6". It would be suitable that such display of information to the side window glasses 6", for example, a message in a taxi such as "Thank you for waiting" or "Please board" is displayed to passengers or the like on a street.

In addition, in the example described above, the vehicle information display apparatuses 100, 100', and 100" configured to display video information to be displayed to the outside or the inside of the vehicle through the windshield 6, the rear window glass 6', or the side window glasses 6", which is the projected member constituting the vehicle, in one direction have been described. However, the present invention is not limited to these. For example, it is possible to appropriately combine the vehicle information display apparatus 100' configured to display information to the outside of the vehicle with the vehicle information display apparatus 100 configured to display information to the inside of the vehicle. According to this, for example, it is possible to display various kinds of information containing promotion, advertisement, or notification to the public outside the vehicle through the rear window glass 6' or the side window glasses 6" by applying the present invention to buses or electric trains that are public transportation (however, it is not visually recognized from the inside of the vehicle), and this makes it possible to display valid information to the public.

As described above, various embodiments have been described in detail. However, the present invention is not limited to the embodiments described above, and various modifications are contained. For example, the whole system has been explained in detail in the embodiments described above for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

REFERENCE SIGNS LIST

1 . . . automobile (vehicle) main body, 6 . . . windshield, 6' . . . rear window glass, 6" . . . side window glass, 100 . . . vehicle information display apparatus, 101 . . . light source apparatus, 48 . . . video display apparatus (video projecting apparatus), 50 . . . protective cover, 50a . . . membrane or film, 50b . . . wave plate, 51 . . . transparent sheet (film), 52 . . . liquid crystal display panel (video display element), 54 . . . light direction converting panel, 55 . . . transparent diffusion sheet member, 56 . . . substrate, 57 . . . polarizing plate, 58 . . . phase difference plate, 59 . . . black stripe, 300 . . . smartphone.

The invention claimed is:

1. A vehicle information display apparatus for using a part of a shield glass of a vehicle as a display region to display information on an inside of the vehicle, the vehicle information display apparatus comprising:
    a video display apparatus provided inside the vehicle, the video display apparatus being configured to project video light of the information;
    a transparent sheet provided on an inner surface of the display region set to the part of the shield glass; and
    a light direction converting panel configured to convert a direction of the video light from the video display apparatus toward the transparent sheet,
    wherein the transparent sheet includes a phase difference plate, an absorption type polarizing plate configured to absorb a specific polarized wave, and a transparent sheet member having a light diffusion effect in order from a side of the shield glass toward the video display apparatus, and
    wherein the information by the video light whose direction is converted by the light direction converting panel is displayed to the inside of the vehicle.

2. The vehicle information display apparatus according to claim 1, further comprising:
    a protective cover provided on one surface of the light direction converting panel, the protective cover being configured to reduce surface reflection of outside light.

3. The vehicle information display apparatus according to claim 1,
    wherein the transparent sheet is configured to display the information to the inside of the vehicle by reflecting the video light.

4. The vehicle information display apparatus according to claim 1,
    wherein the transparent sheet is configured to display the information to an outside of the vehicle by transmitting the video light.

5. The vehicle information display apparatus according to claim 1,
    wherein the light direction converting panel is formed by a linear Fresnel lens.

6. The vehicle information display apparatus according to claim 2,
    wherein the protective cover has a membrane or film configured to absorb or reflect polarized wave components from an outside of the vehicle.

7. An information display system for vehicle for using a part of a shield glass of a vehicle to display information,
    wherein at least one of the vehicle information display apparatuses respectively described in claim 1 is provided in the vehicle, and
    wherein the part of the shield glass of the vehicle is used as a display region, and video light from the vehicle information display apparatus is projected toward the transparent sheet provided on the inner surface of the display region that is provided at the part of the shield glass of the vehicle.

8. The information display system for vehicle according to claim 7,
    wherein the shield glass is a windshield.

9. The information display system for vehicle according to claim 8,
    wherein on the windshield, a plurality of vehicle information display apparatuses is used to display information of the video light to an inside and an outside of the vehicle.

10. The information display system for vehicle according to claim 8,
    wherein a head up display apparatus is mounted in the information display system for vehicle.

11. The information display system for vehicle according to claim 7,
    wherein the shield glass is a rear window glass or a side window glass.

12. The information display system for vehicle according to claim 11,
    wherein on the rear window glass or the side window glass, at least one of the vehicle information display apparatuses is used to display information of the video light to an outside of the vehicle.

* * * * *